(12) United States Patent
Hoffman (10) Patent No.: US 11,716,405 B1
(45) Date of Patent: Aug. 1, 2023

(54) SYSTEM AND METHOD FOR IDENTIFYING CACHE MISS IN BACKEND APPLICATION

(71) Applicant: Splunk Inc., San Francisco, CA (US)

(72) Inventor: William Matthew Hoffman, Roswell, GA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/230,131

(22) Filed: Apr. 14, 2021

(51) Int. Cl.
*G06F 15/16* (2006.01)
*H04L 67/568* (2022.01)
*G06F 16/957* (2019.01)

(52) U.S. Cl.
CPC ........ *H04L 67/568* (2022.05); *G06F 16/9574* (2019.01)

(58) Field of Classification Search
CPC .......................... H04L 67/2842; G06F 16/9574
USPC ........................................................ 709/218
See application file for complete search history.

(56) References Cited

U.S. PATENT DOCUMENTS

| | | | |
|---|---|---|---|
| 6,658,463 B1 * | 12/2003 | Dillon ................ | H04L 67/5682 709/219 |
| 7,774,782 B1 | 8/2010 | Popescu et al. | |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2003/0084143 A1 | 5/2003 | Knoesel et al. | |
| 2003/0149567 A1 | 8/2003 | Schmitz et al. | |
| 2007/0245409 A1 * | 10/2007 | Harris .................... | H04L 67/06 726/5 |
| 2007/0299869 A1 * | 12/2007 | Clary .................. | H04L 41/5009 |
| 2008/0209030 A1 | 8/2008 | Goldszmidt et al. | |
| 2011/0055314 A1 | 3/2011 | Rosenstein et al. | |
| 2016/0306894 A1 | 10/2016 | Liang | |
| 2018/0278688 A1 * | 9/2018 | Gal ..................... | H04L 61/4511 |

(Continued)

FOREIGN PATENT DOCUMENTS

EP      2892207 A1 *   7/2015    ......... H04L 67/2814

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Suraj M Joshi
*Assistant Examiner* — Joel Mesa
(74) *Attorney, Agent, or Firm* — Knobbe, Martens, Olson & Bear, LLP (57) ABSTRACT

A method for improving loading time of network results associated with cache misses at a server. The method can include requesting content associated with a webserver; receiving responses from the server; identifying a particular response that includes a cache miss indicator in a header portion of a network message; determining whether the content of the particular response is dynamically generated content or static content; and/or causing display of the cache miss indicator based on a determination that the content is dynamically generated content.

20 Claims, 4 Drawing Sheets

(56) References Cited

U.S. PATENT DOCUMENTS

2019/0098106 A1    3/2019  Mungel et al.
2019/0227936 A1*  7/2019  Jang ........................ G06F 9/545

OTHER PUBLICATIONS

Carraso, David, "Exploring Splunk," published by CITO Research, New York, NY, Apr. 2012.

SLAML 10 Reports, Workshop on Managing Systems via Log Analysis and Machine Learning Techniques, ;login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

U.S. Appl. No. 17/230,138**, filed Apr. 14, 2021 to Hoffman.

\* cited by examiner

FIG. 1

```
HTTP/2.0 200
status: 200
date: Fri, 19 June 2020 19:23:46 GMT
content-type: text/html; charset=UTF-8
set-cookie: cfduid=d42e0f451eada9256; expires=Sun, 19-Ju-20
x-drupal-dynamic-cache: MISS
x-us-compatibile: IE=edge
content-language: en
x-content-type-options: nosniff
x-frame-options: SAMEORIGIN
expires: Sun, 19 Nov 1878 05:00:00 GMT
vary: Cookie, Access-Encoding
x-generator: Drupal 8 ("https://drupal.org)
x-drupal-cache: MISS
x-request-id: v-3ec1fac-b1b2-11ea=9784-5f25c3590c93
x-ah-environment: prod
Via: varnish
```

SYSTEM AND METHOD FOR IDENTIFYING CACHE MISS IN BACKEND APPLICATION

CROSS-REFERENCES TO RELATED APPLICATIONS

This application is being filed on Apr. 14, 2021 concurrently with the following U.S. Patent Applications, each of which is incorporated by reference herein in its entirety:

| Patent Application Title | Filing Date | Application No. |
|---|---|---|
| System And Method For Identifying Resource Access Faults Based On Webpage Assessment | Apr. 14, 2021 | 17/230138 |

FIELD

Various embodiments of the disclosure relate to improving webpage loading time. More specifically, various embodiments of the disclosure relate to identifying, indicating, and/or resolving cache misses in a backend cache system.

BACKGROUND

When delivering web content, much of the latency involved with retrieving web assets such as images, HTML documents, video, JavaScript files, CSS, fonts, etc. can be greatly reduced by caching those artifacts and eliminating disk reads and server load. Various web caching techniques can be employed both on the server side and on the client side. For example, caches can be applied and leveraged throughout various layers of backend applications including reverse proxies, resource caches, content delivery networks (CDNs), database queries, objects and API data, components or pages, application and op code, among others.

BRIEF DESCRIPTION OF THE DRAWINGS

The present disclosure is illustrated by way of example, and not limitation, in the figures of the accompanying drawings, in which like reference numerals indicate similar elements and in which.

DETAILED DESCRIPTION

A cache is a reserved storage location that collects temporary data, such as static or dynamic content, to help websites, browsers, and apps load faster. A cache miss is an event in which a system or application makes a request to retrieve data from the cache, but that specific data is not in cache memory. In general, a cache miss signals a slower response, but it can also be indicative of a larger issue. For example, on newly started servers or infrastructure, or on a server with low traffic, a cache miss may occur because there was simply no data to reuse from a previous visitor. However, persistent cache misses or cache misses on a public server of reasonable size may indicate that a backend system is not configured properly. For at least these reasons, it can be advantageous to identify when cache misses occur. Furthermore, a cache miss for dynamic content can have a larger impact on performance than a cache miss for static content because the dynamic content may initiate one or more additional resource requests or processes that can add to the a servers' response time. Accordingly, it can be advantageous to differentiate cache misses for dynamic content from cache misses for static content.

To address these or other challenges, techniques for identifying cache misses are disclosed herein. A recommendation system can be implemented to assess websites, web applications, or APIs for indications of a cache miss in a backend application, as well as the type of content associated with the cache miss. By identifying when or where a cache miss occurs and the type of content associated with the cache miss, the recommendation system can provide indications of the cache miss and/or guidance for making modifications to resolve issues associated with the backend applications, which can improve the webpage performance and the overall effectiveness of a webpage.

In light of the description herein, it will be understood that the embodiments disclosed herein substantially improve network communication and website performance. Specifically, the embodiments disclosed herein enable a system to monitor the performance of a webpage, including the use and performance of individual computing resources used to load the webpage, determine whether there are any cache misses associated with the webpage loading, determine whether a particular cache miss is associated with dynamic or static content, identify a backend cache associated with the cache miss, identify computer-readable instructions or code that resulted in the cache miss, provide instructions to address the identified cache miss, and, in some cases, correct the cache miss in the computer-readable instructions, and/or generate computer-readable or executable instructions to fix the identified cache miss. The ability to monitor webpage performance and identify cache misses enables the systems to adjust to ensure the cache gets more hits, which improves the speed of the webpage load time, decreases the number or amount of computer resources used to load the webpage, and reduces network usage by requesting less data or resources for use. Furthermore, given the number of webpages and real-time tracking of cache misses, and analysis of computer protocol messages, it is not practical for a human to conduct these analyses.

Thus, the presently disclosed embodiments represent an improvement at least in the functioning of network devices and webpage loading. Moreover, the presently disclosed embodiments address technical problems inherent within the networked systems and the Internet. These technical problems are addressed by the various technical solutions described herein, including the monitoring of the webpage, identifying cache misses, determining whether a cache miss is for dynamic or static content, identifying computer-readable instructions associated with the cache miss, or correcting or providing information to correct the cache miss, etc. Thus, the present application represents a substantial improvement on existing network systems in general.

Environment Overview

Figure 1:
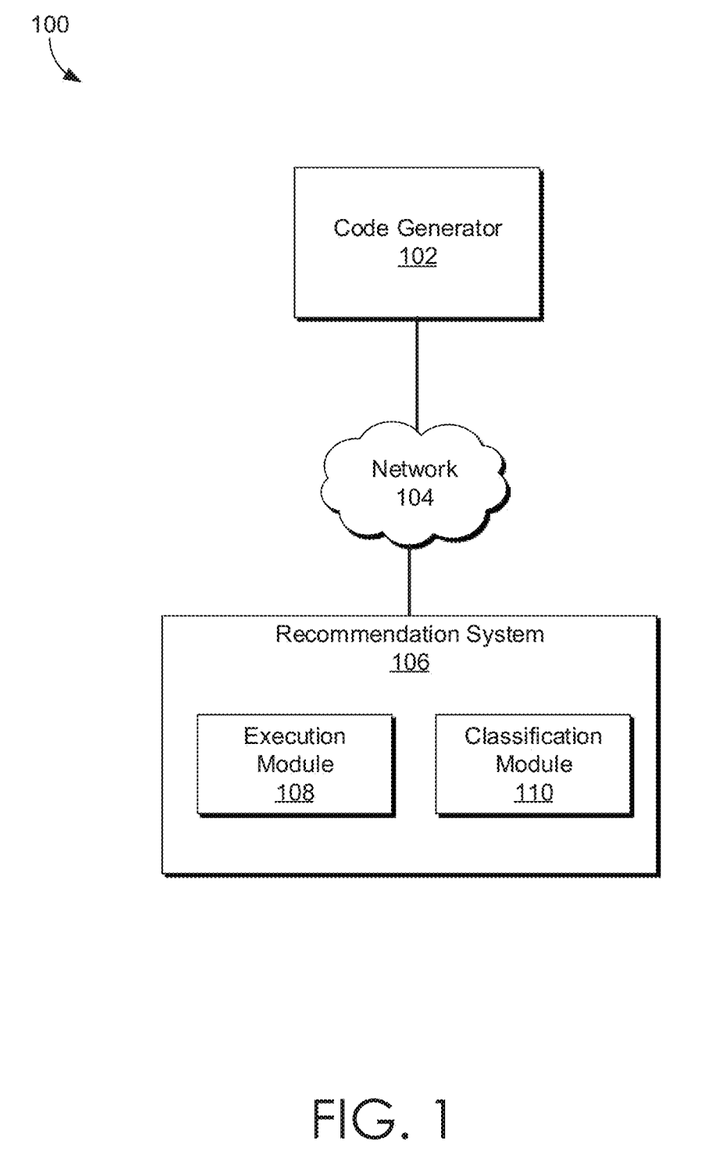
FIG. 1 illustrates an embodiment of an environment for improving webpage load performance.

FIG. 1 illustrates an embodiment of an environment 100 that includes a network 104, a code generator 102, and a recommendation system 106. In the illustrated embodiment, the recommendation system 106 includes an execution module 108 and a classification module 110. To simplify discussion and not to limit the present disclosure, FIG. 1 illustrates only one code generator 102 and recommendation system 106, though multiple may be used.

Any of the foregoing components or systems of the environment 100 may communicate via the network 104. Although only one network 104 is illustrated, multiple distinct and/or distributed networks 160 may exist. The network 104 can include any type of communication network. For example, the network 104 can include one or more of a wide area network (WAN), a local area network (LAN), a cellular network, an ad hoc network, a satellite network, a wired network, a wireless network, and so forth. In some embodiments, the network 104 can include the Internet.

Any of the foregoing components or systems of the environment 100, such as any one or any combination of the code generator 102, the recommendation system 106, the execution module 108, or the classification module 110 may be implemented using individual computing devices, processors, distributed processing systems, servers, isolated execution environments (e.g., virtual machines, containers, etc.), shared computing resources, or so on. Furthermore, any of the foregoing components or systems of the environment 100 may host or execute one or more client applications, which may include a web browser, a mobile application, a background process that performs various operations with or without direct interaction from a user, or a "plug-in" or "extension" to another application, such as a web browser plug-in or extension.

The code generator 102 can facilitate creating, editing, or publishing a webpage. For example, the code generator 102 may include hardware and software components for establishing communications over the network 104. The code generator 102 may have varied local computing resources such as central processing units and architectures, memory, mass storage, graphics processing units, communication network availability and bandwidth, and so forth. Further, the code generator 102 may include any type of computing system. For example, the code generator 102 may include any type of computing device(s), such as desktops, laptops, and wireless mobile devices (for example, smart phones, PDAs, tablets, or the like), to name a few.

In some cases, the code generator 102 includes web site generation software (e.g., Adobe Dreamweaver CC, Wix, WordPress, Weebly, Webflow, Bluefish, etc.) that aid users in building websites, such as various tools for the creation of websites. As another example, the code generator 102 may include an interface for writing or uploading any of various programming languages including, but not limited to, HTML, CSS, Java, JavaScript, Python, C, C++, SQL, or PHP. The code generator 102 can generate, output, or obtain a machine-readable file usable to build a webpage. The machine-readable file can include a plurality of instructions that define the layout, structure, content, etc. of a webpage. For example, the machine-readable file can include, but is not limited to, any combination of HTML, CSS, Java, JavaScript, Python, SQL, or PHP. In some cases, the code generator 102 can be controlled or operated by a user, such as a web developer.

The recommendation system 106 can be implemented to assess websites, web applications, or APIs to determine the presence of a cache miss, as well the type of content (e.g., dynamic or static) associated with the cache miss. In some cases, the code generator 102 may be part of a backend or other system into which the recommendation system 106 has little or no visibility or access. However, in some such cases, recommendation system 106 may be able to use the presence of a cache miss, as well the type of content, to identify potential configuration or other problems associated with the code generator 102. For example, the mere presence of a cache miss can indicate that something in the backend is disabled or misconfigured. Furthermore, a cache miss of static content may indicate a relatively simple backend, while a cache miss of dynamically generated content may indicate a more complex and/or prone-to-cache-misses backend. Thus, in some cases, the recommendation system 106 may gain insight into the configuration of the code generator 102 and/or likely problems associated with the code generator 102 without having knowledge of the configuration of the code generator 102.

In some cases, such as where HTTP is used for network communications, the recommendation system can analyze an HTTP message (including an HTTP head or header portion, which includes one or more headers that can specify the request or describe the content of the HTTP message and/or the HTTP body or body portion, which includes the message content or payload) to determine whether there was a cache miss and determine whether the HTTP body includes content that was dynamically generated or is static.

In certain cases, the recommendation system 106 can identify an HTTP response that includes data indicative of a cache miss (also referred to herein as a "cache miss indicator") to determine that a cache miss occurred in conjunction with the HTTP response. In certain cases, the recommendation system 106 uses one or more headers in the HTTP head as cache miss indicators to determine that a cache miss occurred.

With continued reference to the HTTP example, the recommendation system 106 can, in certain cases, parse the HTTP message to determine the likelihood that the content of the HTTP body is dynamically generated or static. Based on the determined likelihood, the recommendation system 106 can determine that the HTTP body includes dynamically generated content or static content. In some such cases, the recommendation system 106 can use one or more dynamic content indicators, and/or static content indicators to determine whether the content of the HTTP body is dynamically generated or static. In some cases, the recommendation system 106 uses one or more headers in the HTTP head as the dynamic content indicators, and/or static content indicators to determine whether the HTTP body includes dynamically generated content or static content.

In some cases, static content can refer to content that is in existence prior to the HTTP request. For example, static content can include a file that exists prior to the HTTP request being received by a server. In a scenario in which a client computing device requests the file from a server, the server can provide the file to the client computing device as part of the HTTP response. For example, in some cases, the content of a specific CSS file does not change based on the client computing device that is requesting it. In some such cases, the CSS file can exist as a file on the server, which can be directly sent to the client computing device with low or minimal server resources used.

In certain cases, dynamically generated content can refer to content that is generated in response to, or after receipt of, an HTTP request. In some cases, the dynamically generated content may not exist prior to the HTTP request. In some such cases, one or more computer modules may, in response to the HTTP request, execute code that results in the generation of the dynamically generated content. As a non-limiting example, consider a scenario in which a server receives an HTTP request from a client computing device that includes commands to execute and return results of a search. In response to the HTTP request, the server executes the search and begins returning results to the client computing device via one or more HTTP responses. In such a scenario, the HTTP body of the HTTP response(s) can include the search results, which are dynamically generated in response to the HTTP request. As another non-limiting example, consider a scenario in which a server receives an HTTP request for an image from a client computing device. In some such cases, the image may be a static file. In other cases, the image may be dynamically generated. For example, the image may be dynamically generated based at least in part on properties of the client computing device (e.g., whether the device is a mobile device, the capabilities of the screen, whether the device is likely to be on a mobile network, etc.). For instance, the server can dynamically alter the image to something appropriate for the device, for example by resizing the file, reducing its quality to reduce its size, or changing the image's format to a format that is better suited for that client computing device. Although the foregoing examples used HTTP, it will be understood that other computer protocols can be used where the recommendation system 106 can analyze a header portion of a computer protocol message to determine the dynamic or static content of a body portion of the message.

By identifying when and where a cache miss occurs and the type of content associated with it, the recommendation system 106 can provide guidance for making modifications to resolve issues associated with the backend applications. For example, the recommendation system 106 can provide instructions regarding where (in the webpage code or the developer's native code) to find the portion of code that can be modified to improve webpage performance, how to modify the code, and/or why that portion of code is undesirable. In this way, the recommendation system 106 can improve the functioning of a networked computing device and the response time of webpages. Furthermore, by identifying the type of content associated with a cache miss, the recommendation system 106 can identify the severity and/or assign a priority to the cache misses. As mentioned, dynamically generated content is generally more computationally expensive than static content. Thus, in some cases, the recommendation system 106 can assign a higher priority or severity levels to cache misses that are determined to be associated with dynamically generated content and can assign lower priority or severity levels to cache misses that are determined to be associated with static content. Furthermore, the recommendation system 106 provide guidance for making modifications to resolve issues associated with the backend applications, in some cases giving preference to resolving higher priority cache misses before lower priority cache misses.

For ease of description, the recommendation system 106 is described as including various modules for performing tasks of the recommendation system 106. In particular, the recommendation system 106 can include an execution module 108 and a classification module 110. However, it will be understood that the recommendation system 106 can include fewer, more, or different modules and further understood that the execution module 108 or the classification module 110 can be combined. Furthermore, it will be understood that any of the systems or modules described herein may include software, firmware, hardware, or any combination(s) of software, firmware, or hardware suitable for the purposes described.

The execution module 108 can facilitate the load of a particular webpage. For example, the execution module 108 can communicate a URL to a browser to cause a browser to load the webpage. In some cases, in response to receiving an indication of the URL from the execution module 108, the browser looks up an associated IP address for the domain name via the Domain Name System (DNS), initiates a connection to that IP address, and receives a machine-readable file (e.g., an HTML page) associated with the webpage. When the machine-readable file is downloaded, the browser parses the machine-readable file to load in resources used to display the webpage properly. Examples of such resources include, but are not limited to, CSS files, Javascript files, images, fonts, and other webpages.

The machine-readable file can vary across embodiments. A Hypertext Markup Language (HTML) file is a webpage file type used in Internet communications. Thus, in some cases, the machine-readable file is an HTML file. However, the machine-readable file can be any type of file usable by the browser to render a webpage. For example, the machine-readable file can include a plurality of instructions that define the webpage layout and the content of the webpage, such as the text, tables, images, or hyperlinks associated with the webpage.

The execution module 108 can communicate the URL to the browser in various ways. For example, in some cases, the execution module 108 includes a user interface, from which a user may select a hyperlink, submit a form, or type in the URL. As another example, the execution module 108 may be configured to obtain the URL (e.g., from memory, from another browser tabs, from another browser) and pass the URL to the browser. In some cases, the execution module 108 includes or is part of the browser. In some such cases, the execution module 108 can receive an indication of the URL, look up an associated IP address for the domain name via the DNS, initiate a connection to that IP address, receive the machine-readable file associated with the web page, and/or parse the machine-readable file to load in the other resources that are part of the webpage.

The execution module 108 can utilize a request-response protocol (e.g., HTTP) to facilitate the load of a particular webpage. In some cases, the execution module 108 can communicate (or cause communication of) requests for resources to a server and can receive a response to each request. As a non-limiting example, the execution module 108 can communicate HTTP requests to the server to request resources associated with rendering the webpage (e.g., CSS files, Javascript files, images, fonts, and other webpages), and the server can respond with HTTP response messages.

In some cases, the classification module 110 can determine the presence or absence of a cache miss by analyzing one or more portions of a message. In certain cases, the classification module 110 parses the entire message for cache miss indicators (e.g., patterns, commands, header information, symbols, or other tokens indicative of a cache miss). In some cases, the classification module 110 parses some portions of a message (e.g., a header portion that specifies the message request, includes information or metadata about the message, or describes the content or body of the message) for cache miss indicators but not others (e.g., a body portion that includes the payload or content of the message). As mentioned, the header portion can include multiple headers. In some cases, a header can include a header identifier and a header value. In certain cases, the header identifier and value may be displayed similar to a field-value pair, where the header identifier is in the position of a field identifier and the header value is in the position of a field value. In some such cases, the classification module 110 can analyze header identifiers and/or header values in the headers of the header portion of the message to identify cache miss indicators. In certain cases, the classification module 110 parses only the header identifiers or only the header values of the headers to identify cache miss indicators.

In certain cases, the classification module 110 can include a directory or listing of cache miss indicators. For example, the directory or listing may identify any one or any combination of the following tokens as cache miss indicators: a header having an "x-" prefix (e.g., as part of a header identifier), a header including one or more of the terms "cache," "miss," or "cache miss," (e.g., as part of the header identifier and/or the header value) or a header having an "x-" prefix and including one or more of the terms "cache," "miss," or "cache miss," etc. It will be understood that the tokens used as cache miss indicators can vary across embodiments. The directory or listing may be stored as one or more entries in a data store or database or as a file, etc.

In some cases, to determine the presence or absence of a cache miss, the classification module 110 can parse the response message for a token that matches a cache miss indicator of the classification module's 110 directory. In some such cases, if the classification module 110 identifies the presence of a cache miss indicator in the response message, the classification module 110 can determine the presence of a cache miss. As a corollary, if the classification module 110 does not identify any cache miss indicators in the response message, the classification module 110 can determine the absence of a cache miss or determine a cache hit.

The classification module 110 can also determine whether the content of a response message is dynamically generated content or statically generated content. In some cases, the classification module 110 can make this determination based on the presence of one or more dynamic content indicators, and/or static content indicators.

Although it can be difficult, especially for a computing device, to determine whether content in the message body is dynamically generated or statically generated, the classification module 110 can parse one or more headers in a header portion of the response message to evaluate the likelihood that content is statically or dynamically generated. For example, some headers may tend to be associated with dynamically generated content, while other headers may tend to be associated with statically generated content. As another example, the absence of a particular head may tend to be associated with either dynamically generated content or statically generated content.

Headers that tend to be associated with dynamically generated content can be referred to as dynamic content headers (an example of a dynamic content indicator) and can include, but are not limited to, headers that are commonly added by backend components of the code generator 10, and/or whose presence indicates the response was handled by such a backend system. For example, dynamic content headers can include, but are not limited to, x-powered-by header, x-aspnet-version header, x-runtime header, and x-generator header. Additionally, there are headers whose presence is associated with backend logic of some kind, which can indicate a response is dynamically generated. These include, but are not limited to, the set-cookie header, and Transfer-Encoding: chunked header. Headers that tend to be associated with statically generated content may be referred to as static content headers (an example of a static content indicator) and can include, but are not limited to, accept-ranges header, last-modified header, content size header, accept-bytes header, or content-length header. For example, the Last-Modified HTTP header can describe when the response content was last modified. This often maps directly to the "file last modified time" meta data associated with a static file present in the file system of the server. As another example, the Content Size HTTP header can describe the size in bytes of the response. This often maps directly to the "file size" meta data associated with a static file present in the file system. The file size is generally unknown ahead of time for dynamically generated content, so the presence of a content-size can be an indicator of static content. As another example, the "Accept-Bytes" HTTP header can indicate that a client computing device can request small pieces of a response, instead of downloading the entire response. This often correlates with content that exists as a static file on the server, since files can be opened and only a small piece of the content returned. Moreover, it is difficult for only a small piece of a dynamically generated response to be requested, so the presence of an accept-bytes header can be an indication of static content, while its absence can be an indication of dynamically generated content. Although reference may be made to dynamic content headers and static content headers, it will be understood that tokens other than headers or portions of headers may be used as dynamic content indicators and/or static content indicators.

Based on the presence of dynamic content indicators and/or static content indicators, the classification module 110 can evaluate the likelihood that the content of a response message (e.g., the content of the payload or body of the message) is dynamically or statically generated, and based on the evaluated likelihood determine that the content of a response message is dynamically generated content or static content. For example, the classification module 110 can parse the headers of a header portion of a response message to identify which headers are present in the message. In some cases, based on a determination that the response message includes a dynamic content header or a threshold number of dynamic content headers (e.g., 2, 3, 4, or more), the classification module 110 can determine that the body of the response message is or includes dynamically generated content. As another example, in some cases, based on a determination that the response message includes a static content header or a threshold number of static content headers (e.g., 2, 3, 4, or more), the classification module 110 can determine that the body of the response message does not include dynamically generated content or is static content.

In some cases, a response message may include one or more dynamic content indicators and one or more static content indicators. In some such cases, the classification module may implement a scoring policy to assign values to the dynamic content indicators and/or the static content indicators and calculate one or more scores to facilitate the determination of whether the content of the response message is dynamically generated content.

The scoring policy can vary across embodiments. For example, in some cases, the scoring policy may assign equal weight to each dynamic content indicator and static content indicator such that the scoring policy effectively compares the number of dynamic content indicators present in the response message with the number of static content indicators present in the response message to determine whether the content of the response message is dynamically generated content. In some such cases, if the number of dynamic content indicators exceeds the number of static content indicators, the classification module 110 can determine that some or all of the content of a response message is dynamically generated content.

In some cases, the scoring policy can assign various weights to the dynamic content indicators and/or static content indicators. For example, in some instances, the presence of an x-aspnet-version header is a stronger indication that the response message is associated with dynamic content than the presence of a set-cookie header. In some such cases, the scoring policy can assign a greater weight to the x-aspnet-version header than the set-cookie header. It will be understood that weighting values assigned to dynamic content indicators and/or static content indicators can vary across embodiments.

In some cases, the scoring policy can indicate that the values or weights of (dynamic and/or static) content indicators are to be summed. If the sum satisfies a dynamic content threshold, the classification module can indicate that the message includes dynamically generated content in the body. If the sum does not satisfy the dynamic content threshold, the classification module can determine that the message does not include dynamically generated content in the body. In certain cases, the values associated with dynamic content indicators can be positive values and the values associated with static content indicates can be negative, or vice versa. It will be understood that the scoring policy can indicate that other mechanisms are to be used to determine whether a message body includes dynamically generated content. For example, the scoring policy can use multiplication, division, or parabolics, logs, or other methods to determine whether a message includes dynamically generated content. Accordingly, in certain cases, the classification module can use multiple content indicators, each associated with a weighting value, to determine whether a message includes dynamically generated content.

Cache Miss Examples

As described, the recommendation system 106 can parse a response message to determine whether the response message is associated with a cache miss and, if so, whether the cache miss is associated with dynamic content. Consider an example, in which the recommendation system 106 determines the presence of a cache miss based on the text of the HTTP response message. In particular, in this example, the recommendation system 106 can determine that any HTTP response message that includes at least one of the terms "cache" or "miss" is to be identified as being associated with a cache miss. Furthermore, the recommendation system 106 can determine that any HTTP response message that does not include at least one of the terms "cache" or "miss" is to be identified as being associated with a cache hit.

Furthermore, in this example, the recommendation system 106 can determine whether the content (e.g., the message payload or body) of the particular response is dynamically generated content based on the text of the HTTP response message. In particular, in this example, the recommendation system 106 uses a scoring policy to calculate a score and compares the score to a threshold score to determine whether the content of the HTTP response message is dynamically generated content. Table 1 illustrates example value assignments for content indicators (in this case headers in a header portion of a message) identified by the scoring policy.

TABLE 1

| Header | Value |
|---|---|
| x-powered-by | 50 |
| x-aspnet-version | 80 |
| x-runtime | 80 |
| x-generator | 50 |
| set-cookie | 40 |
| chunked | 70 |
| accept-ranges | −100 |
| last-modified | −10 |
| content-length | −10 |

As illustrated by Table 1, in this example, the scoring policy assigns positive values to dynamic content headers (e.g., headers that tend to be associated with dynamic content) and negative values to static content headers (e.g., headers that tend to be associated with static content). Continuing with this example, to determine the score for a particular HTTP response message, the recommendation system 106 identifies whether the HTTP response message includes any of the headers of Table 1 and, if so, adds the value associated with the identified headers. The result is the score. In this example, if the score is positive, then the recommendation system 106 determines that the content of that HTTP response message is dynamically generated content and if the score is 0 or negative, then the recommendation system 106 determines that the content of that HTTP response message is statically generated content. It will be understood that the headers, as well as the weights/values given to the headers, and the function used to calculate the score can vary across implementations. It will be understood that the scoring policy may use any combination of weighting factors and mathematical formulas to determine the score.

Figure 2:
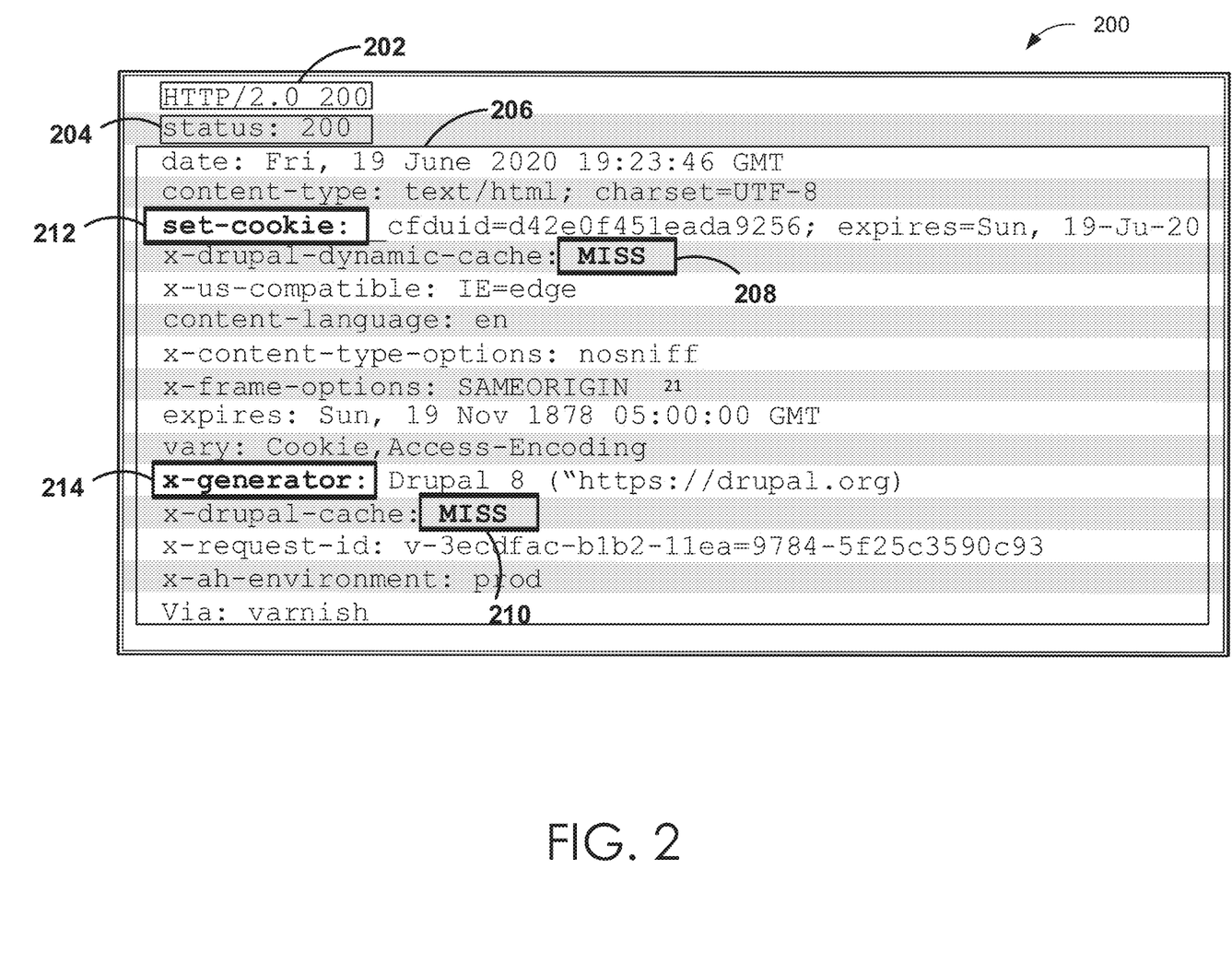
FIG. 2 illustrates an example HTTP response message that includes indications of dynamically generated content.

FIG. 2 illustrates an example HTTP response message header portion 200 received from a server in response to a request for content. As shown, the HTTP response message header portion 200 includes an HTTP version identifier 202, a status code 204, and a set of response header fields 206. In particular, FIG. 2 illustrates two custom HTTP headers (x-drupal-cache and x-drupal-dynamic-cache) that include a cache miss indicator ("MISS"). These headers come from caches used by the Drupal CMS and reveal that Drupal's built in page cache did not have this page, indicating a potentially misconfigured page cache. By determining that the header data indicative of a cache miss and/or the content of the HTTP response message header portion 200, the recommendations system 108 can facilitate optimizing this backend cache so it can handle the request, which can result in faster performance metrics and lower load on the server-side infrastructure.

Continuing with the example conditions described above, as well as the header/value assignments shown in Table 1, the recommendation system 106 can determine that the HTTP response message header portion 200 includes header data indicative of a cache miss and can further determine that the content of the HTTP response message header portion 200 is dynamically generated content. Example steps for making this determination are described below.

The recommendation system 106 analyzes the HTTP response message header portion 200 to determine whether the HTTP response message header portion 200 includes header data indicative of a cache miss. In the example of FIG. 2, based on the identification of the first "miss" 208 and/or the second "miss" 210, the recommendation system 106 determines that the header data of the HTTP response message header portion 200 includes a cache miss indicator.

In the illustrated example, the cache miss indicators were identified as header values of different headers, however, it will be understood that the recommendation system 106 can parse other portions of the header portion 200, such as the header identifiers, to identify cache miss indicators. In certain cases, the recommendation system 106 can parse a body portion of the HTTP response message to identify cache miss indicators.

Based on the identification of a cache miss indicator, the recommendation system 106 further analyzes the HTTP response message header portion 200 to determine whether content of the HTTP response message (e.g., some or all of a body portion or payload portion of the HTTP response message) is dynamically generated content. Applying the assignments of Table 1, the recommendation system 106 identifies the set-cookie header field 212 (value=40) and the x-generator header field (value=50), and calculates the score to be 90. Based on the determination that the score is positive, the recommendation system 106 determines that the content of the response includes dynamically generated content.

In the illustrated example, the dynamic content indicators were identified as header identifiers of different headers (or dynamic content headers), however, it will be understood that the recommendation system 106 can parse other portions of the header portion 200, such as the header values, to identify dynamic content identifiers. In certain cases, the recommendation system 106 can parse a body portion of the HTTP response message to identify dynamic content indicators and/or static content indicators.

Based on the determination that the message includes a cache miss indicator and dynamically generated content, the recommendation system 106 can provide suggestions to address the cache miss. In some cases, the cache miss indicator can identify the resource associated with the cache miss to enable a user to determine how to correct the cache miss. In certain cases, the recommendation system can identify the resource based on the location of the cache miss indicator. For example the affected resource may be on the same line of the header portion or identified as field identifier for the cache miss indicator (e.g., in the form "resource identifier: cache miss indicator").

In certain cases, the recommendation system 106 can generate commands associated with the affected resource that may have caused the cache miss. For example, the recommendation system 106 can store commonly used or a predetermined list of commands that can result in cache misses and couple one of the commands with the identified resource. In some cases, the recommendation system 106 can generate commands in different programming languages to aid a user in identifying problematic code that may have resulted in the cache miss.

In certain cases, the recommendation system 106 can generate code that can reduce the likelihood of the cache miss. For example, in addition to identifying the code that caused the cache miss, the recommendation system 106 can provide code that would reduce the likelihood of the cache miss. For example, the system could detect a caching-proxy miss, and suggest changes to the Cache-Control header to head the likelihood of caching-proxy cache miss.

Figure 3:
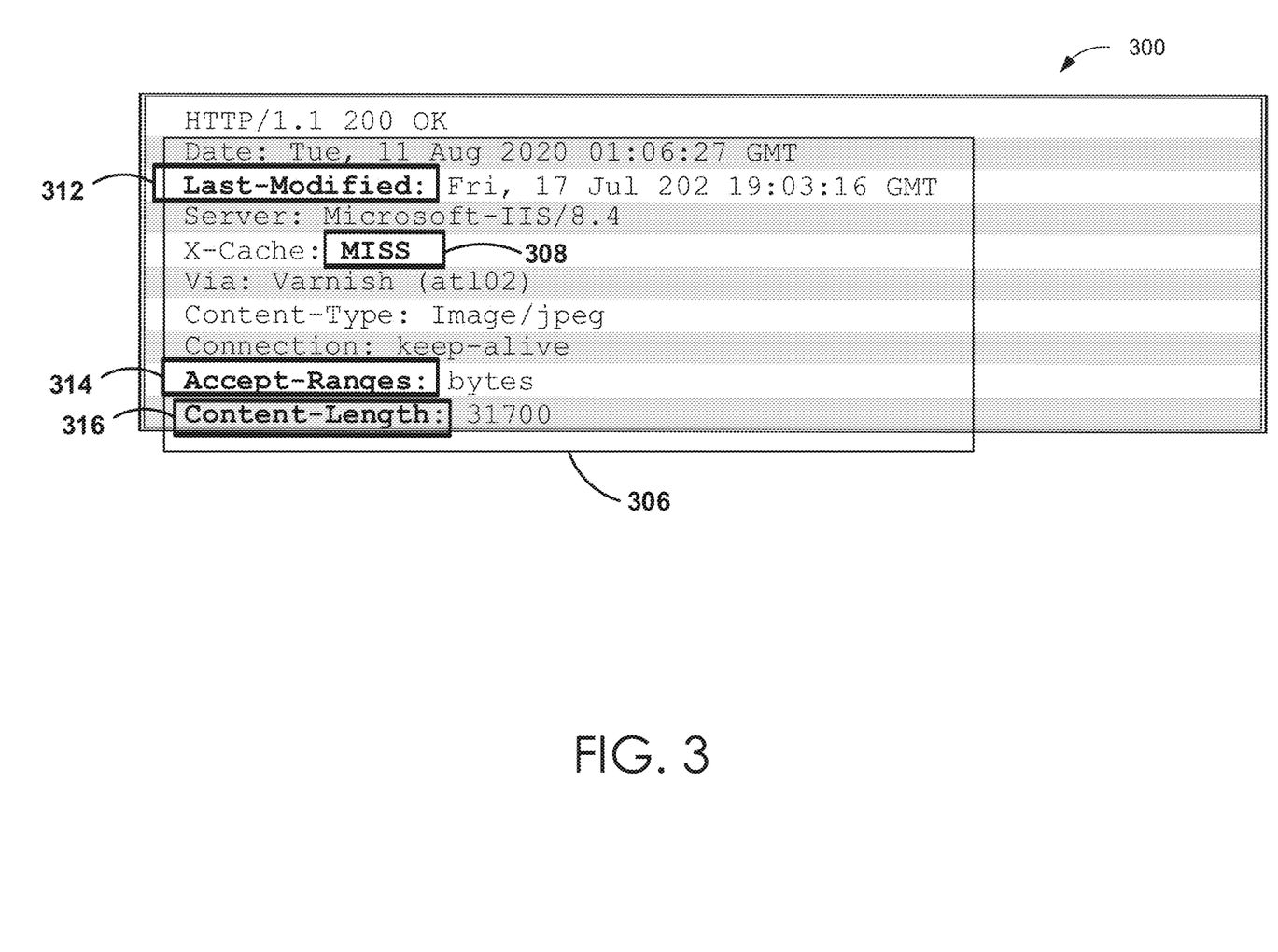
FIG. 3 illustrates an example HTTP response message that includes indications of statically generated content.

FIG. 3 illustrates an example HTTP response message header portion 300 received from the webserver in response to a request for content. As shown, the HTTP response message header portion 300 includes a set of response header fields 306. Continuing with the example conditions described above, as well as the header/value assignments defined in Table 1, the recommendation system 106 can determine that the HTTP response message header portion 300 includes header data indicative of a cache miss and can further determine that the content of the HTTP response message is static content and/or does not include dynamically generated content. Example steps for making this determination are described below.

The recommendation system 106 analyzes the HTTP response message header portion 300 to determine whether the HTTP response message header portion 300 includes header data indicative of a cache miss or a cache miss indicator. In the example of FIG. 3, based on the identification of the "miss" 308, the recommendation system 106 determines that the header data of the HTTP response message includes a cache miss indicator.

The recommendation system 106 further analyzes the HTTP response message header portion 300 to determine whether the content of the HTTP response message includes dynamically generated content. Applying the assignments of Table 1, the recommendation system 106 identifies the last-modified header field 312 (value=−10), the accept ranges header field (value=−100), and the content-length header filed (value=−10), and calculates the score to be −120. Based on the determination that the score is negative, the recommendation system 106 determines that the content of the HTTP response message header portion 300 is not dynamically generated content, or that the HTTP response message header portion 300 is statically generated content. Accordingly, as described herein, the recommendation system 106 uses various indicators, weightings, and/or values to assess the likelihood that an HTTP response message includes dynamically generated content. Based on the determined likelihood, the recommendation system 106 makes a determination that the HTTP response message does not included dynamically generated content.

Flow Diagram

Figure 4:
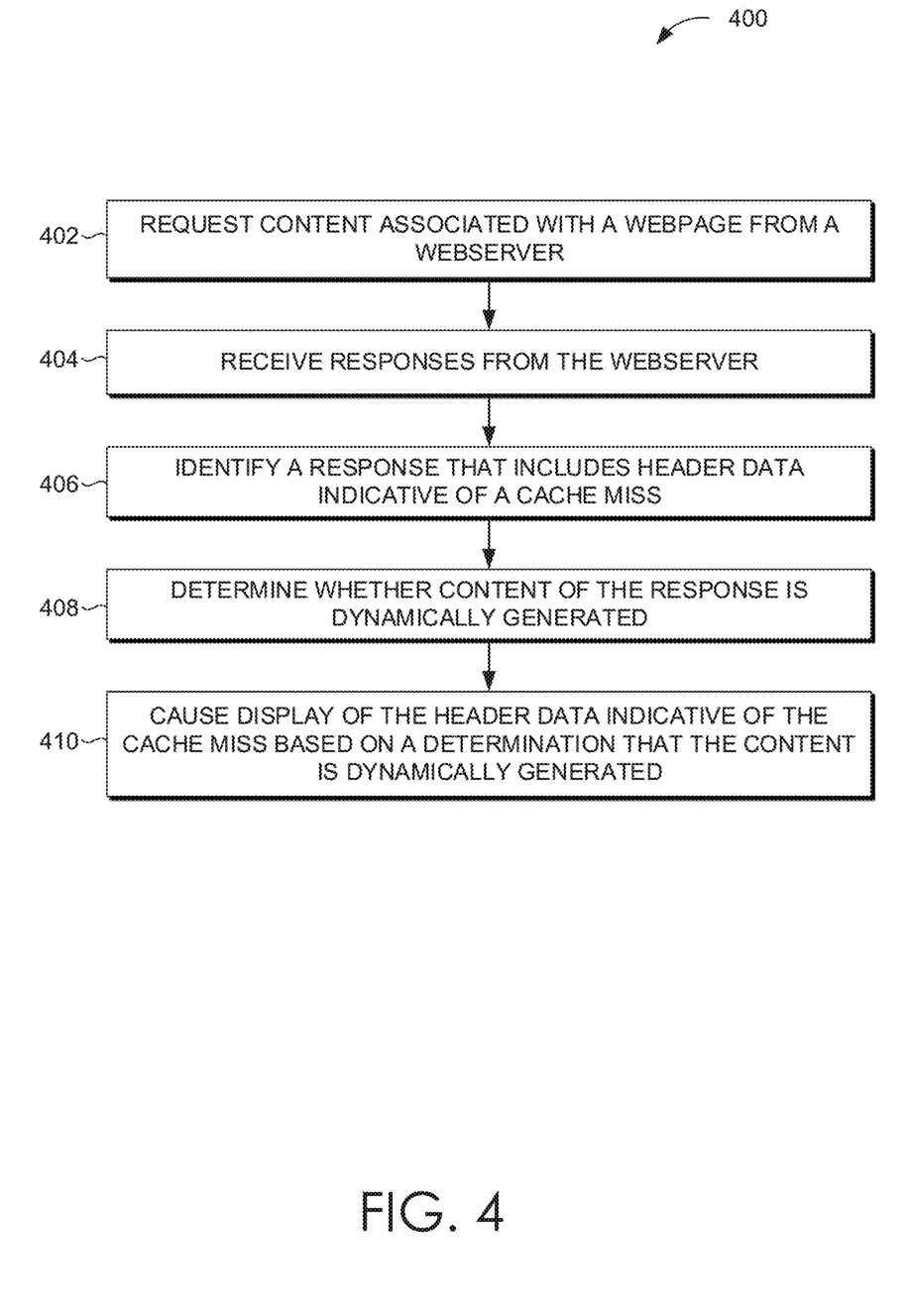
FIG. 4 is a flow diagram illustrative of an embodiment of a routine implemented by a recommendation system for identifying a cache miss and determining whether the cache miss is associated with dynamic content.

FIG. 4 is a flow diagram illustrative of an embodiment of a routine 400 implemented by the recommendation system 106 for identifying a cache miss and using a scoring policy to determine whether the cache miss is for dynamic content. Although described as being implemented by the recommendation system 106, it will be understood that one or more elements outlined for routine 400 can be implemented by one or more computing devices/components that are associated with the recommendation system 106, such as, but not limited to, the execution module 108 and/or the classification module 110. Thus, the following illustrative embodiment should not be construed as limiting.

At block 402, the recommendation system 106 requests content associated with from a server. In some cases, the requests can correspond to requests made for resources as part of rendering a webpage, however, it will be understood that the requests can be for a variety of resources in a networked environments, such as an API call, etc. As a non-limiting example, the recommendation system 106 can send a request to a URL. The DNS can forward the request to the IP of the server associated with that URL, and the server can respond with a specific file, often an HTML file. Once the recommendation system 106 receives the file, it can perform various steps to render the page including, but not limited to, processing HTML markup and building the DOM tree, processing CSS markup and building the CSSOM tree, combining the DOM and CSSOM into a render tree, running the layout on the render tree to compute the geometry of each node, or painting the individual nodes to the screen. To go through these steps, the recommendation system 106 can use additional resources identified by the file (e.g., embedded in the HTML). In some such cases, the recommendation system 106 communicates a variety of requests for these resources, such as HTTP requests.

At block 404, the recommendation system 106 receives responses from the server to provide the recommendation system 106 with the resources it requested at block 402. As described herein, in some cases, the responses can be HTTP responses. In some such cases, each HTTP response can include a status line, a set of HTTP headers (sometimes referred to as header fields) in a header portion, and/or a message body in a body portion or payload portion.

At block 406, the recommendation system 106 identifies a response that includes a cache miss indicator. As described, in some cases, the recommendation system 106 can parse the response to search for particular tokens that match tokens identifies as cache miss indicators. For example, in some cases, the recommendation system 106 can determine that a response is associated with a cache miss based on a determination that a token in the response includes an "x-" prefix and one or more of the terms "cache" or "miss." In certain cases, the recommendation system 106 can parse the entire message or a portion of the message (e.g., the header portion) to identify cache miss indicators.

At block 408, the recommendation system 106 determines that the content of the response is dynamically generated content. As described, in some cases, the recommendation system 106 can parse a header portion of the HTTP response message to identify dynamic content indicators and/or static content indicators that are present in the message. For example, the presence of dynamic content indicators in the response can be indicative of dynamically generated content and the presence of static content indicators in the response can be indicative of statically generated content. In some cases, the recommendation system 106 calculates a score and determines whether the content of the response is dynamically generated content based on the score. For example, based on a determination that the score satisfies a dynamic content threshold or threshold score, the recommendation system 106 can determine that the content (e.g., the body portion or payload) of the response includes or is dynamically generated content. As a corollary, based on a determination that the score does not satisfy the dynamic content threshold or threshold score, the recommendation system 106 can determine that the content of the response does not include is not dynamically generated content.

At block 412, the recommendation system 106 causes display of the header data indicative of the cache miss. As described, a response message can include a status line, a set of headers, and a message body. In some cases, the display of the header data includes an indication of the header field that is associated with a cache miss. In some cases, the display of the header data includes at least a subset of the headers of the response message. For example, the display can include the entire response message where the identified header data is displayed differently (e.g., highlighted, bolded, italicized, etc.) as compared to non-identified header data. In some cases, the display can include summary of each cache miss, for example, the corresponding header data, an indication of the affected resource, a severity level, an indication of why the cache miss occurred, suggested solutions, projected results after solution, or the like.

In some cases, the recommendation system 106 can generate commands that could result in the cache miss. For example, the recommendation system 106 can identify the resource associated with the cache miss. In some cases, the recommendation system can identify the resource associated with the cache miss by parsing the message. For example, the resource associated with the cache miss may be on the same line as or be a header associated with the cache miss indicator.

Using the identified resource, the recommendation system 106 can generate commands to the resource that could have resulted in the cache miss. In some cases, the recommendation system 106 can generate these commands based on commonly used commands to the resource. For example, the recommendation system 106 could generate code such as "Context.Response.CacheControl.MaxAge=60" which could reduce the likelihood of a cache miss for 102 systems utilizing Microsoft's .NET technologies. The recommendation system 106 can generate multiple commands in different programing languages and display these to the user to enable a more rapid identification of code that may have resulted in the cache miss. In some cases, the recommendation system 106 can provide suggestions to reduce the likelihood of these cache misses.

Fewer, more, or different steps can be used as part of the routine 400. In some cases, multiple steps can be performed concurrently. For example, the recommendation system 106 can concurrently determine whether the message includes a cache miss indicator and/or includes dynamically generated content (e.g., in the body portion of the message).

In addition, although described with reference to HTTP messages, it will be understood that the subject matter described herein can be used in a variety of environments using various types of network-based computer protocol messages.

Although the routine 400 is generally described as being associated with a single webpage, it will be understood that the routine 400 can be performed to identify cache misses associated with multiple webpages, such as tens, thousands, or millions or webpages. For example, in some cases, the recommendation system 106 perform the routine 400 for tens, thousands, or millions of webpages concurrently or successively. In this way, the recommendation system 106 may receive thousands or millions of machine readable files and receive tens, thousands, or millions of HTTP responses to identify cache misses and/or content associated with those cache misses.

Furthermore, the routine 400 can be performed multiple times, such as tens, thousands, or millions of times, for the same webpage. For example, the recommendation system 106 can perform the routine 400 multiple times and can take an average result. In some such cases, the routine 400 can be performed concurrently or successively, from various server locations, at various times of the day, at various server loads, etc. In this way, the recommendation system 400 can access the webpage under various webpage and/or server conditions.

Example Embodiments

Embodiments of the present disclosure can be described in view of the following clauses:

Clause 1. A method for improving webpage loading time associated with cache misses at a webserver, the method comprising:

requesting content associated with a webpage from a webserver;

receiving a plurality of responses from the webserver, each response including header data and content data;

identifying, from the plurality of responses, a particular response that includes header data indicative of a cache miss;

determining whether the content of the particular response is dynamically generated content; and causing display of the header data indicative of the cache miss based on a determination that the content is dynamically generated content.

Clause 2. The method of Clause 1, wherein said identifying the particular response comprises:
parsing the particular response to identify a header includes an "x-" prefix, wherein the header data comprises the identified header.

Clause 3. The method of any of the previous clauses, wherein said identifying the particular response comprises:
parsing the particular response to identify a header includes text comprising "x-" "cache", and "miss", wherein the header data comprises the identified header.

Clause 4. The method of any of the previous clauses, further comprising:
determining that the particular response is dynamically generated content based at least in part on content of one or more headers of the particular response.

Clause 5. The method of any of the previous clauses, further comprising determining that the particular response is dynamically generated content based at least in part on a determination that the particular response comprises at least one of an x-powered-by header, an x-aspnet-version header, an x-runtime header, an x-generator header, or a set-cookie header, or a Transfer-Encoding header with a value of "chunked".

Clause 6. The method of any of the previous clauses, further comprising determining that the particular response is dynamically generated content based at least in part on a determination that the particular response comprises chunked encoding.

Clause 7. The method of any of the previous clauses, further comprising determining that the particular response is dynamically generated content based at least in part on a determination that the particular response corresponds to at least one of an HTML request or an API request.

Clause 8. The method of any of the previous clauses, wherein the particular response is a first response of the plurality of responses, wherein the method further comprises:
determining that a second response of the plurality of responses is not dynamically generated content based at least in part on a determination that the particular response comprises at least one of an accept-ranges headers, a last-modified header, or a content-length header.

Clause 9. The method of any of the previous clauses, wherein the particular response is a first response of the plurality of responses, wherein the method further comprises:
determining that a second response of the plurality of responses is not dynamically generated content based at least in part on a determination that the particular response corresponds to at least one of an image, JavaScript file, CSS, video, or font.

Clause 10. The method of any of the previous clauses, further comprising:
determining a score corresponding to a likelihood that that the particular response is dynamically generated, wherein the score is based at least in part on a determination of whether the particular response comprises any of an accept-ranges headers, a last-modified header, or a content-length header, and
determining that the particular response is dynamically generated content based at least in part on the score.

Clause 11. The method of any of the previous clauses, further comprising:
determining a first score corresponding to a likelihood that that the particular response is dynamically generated;
determining a second score corresponding to a likelihood that that the particular response is statically generated; and
determining that the particular response is dynamically generated content based at least in part on the first score and the second score.

Clause 12. The method of any of the previous clauses, further comprising:
determining a first score corresponding to a likelihood that that the particular response is dynamically generated;
determining a second score corresponding to a likelihood that that the particular response is statically generated;
comparing the first score to the second score; and
determining that the particular response is dynamically generated content based at least in part on said comparing the first score to the second score.

Clause 13. The method of any of the previous clauses, further comprising:
determining a first score corresponding to a likelihood that that the particular response is dynamically generated, wherein the first score is based at least in part on a determination of whether the particular response comprises any of an x-powered-by header, an x-aspnet-version header, an x-runtime header, an x-generator header, or a set-cookie header, or a Transfer-Encoding: chunked header;
determining a second score corresponding to a likelihood that that the particular response is statically generated, wherein the second score is based at least in part on a determination of whether the particular response comprises any of an accept-ranges headers, a last-modified header, or a content-length header; and
determining that the particular response is dynamically generated content based at least in part on a determination that first score is greater than the second score.

Clause 14. The method of any of the previous clauses, further comprising:
determining that a second response of the plurality of responses is not dynamically generated content based at least in part on a determination that the particular response comprises at least one of an accept-ranges headers, a last-modified header, or a content-length header.

Clause 15. A computing system comprising:
memory; and
one or more processors coupled to the memory and configured to:
request content associated with a webpage from a webserver;
receive a plurality of responses from the webserver, each response including header data and content data;
identify, from the plurality of responses, a particular response that includes header data indicative of a cache miss;
determine whether the content of the particular response is dynamically generated content; and
cause display of the header data indicative of the cache miss based on a determination that the content is dynamically generated content.

Clause 16. The computing system of Clause 15, wherein to identify the particular response, the one or more processors are configured to:
parse the particular response to identify a header includes an "x-" prefix, wherein the header data comprises the identified header.

Clause 17. The computing system of any of Clauses 15 to 16, wherein to identify the particular response, the one or more processors are configured to:
parse the particular response to identify a header includes text comprising "x-" "cache", and "miss", wherein the header data comprises the identified header.

Clause 18. The computing system of any of Clauses 15 to 17, wherein the one or more processors are configured to:
determine that the particular response is dynamically generated content based at least in part on content of one or more headers of the particular response.

Clause 19. The computing system of any of Clauses 15 to 18, wherein the one or more processors are configured to determine that the particular response is dynamically generated content based at least in part on a determination that the particular response comprises at least one of an x-powered-by header, an x-aspnet-version header, an x-runtime header, an x-generator header, or a set-cookie header, or a Transfer-Encoding header with a value of "chunked".

Clause 20. The computing system of any of Clauses 15 to 19, wherein the one or more processors are configured to determine that the particular response is dynamically generated content based at least in part on a determination that the particular response comprises chunked encoding.

Clause 21. The computing system of any of Clauses 15 to 20, wherein the one or more processors are configured to determine that the particular response is dynamically generated content based at least in part on a determination that the particular response corresponds to at least one of an HTML request or an API request.

Clause 22. The computing system of any of Clauses 15 to 21, wherein the particular response is a first response of the plurality of responses, wherein the one or more processors are configured to:
determine that a second response of the plurality of responses is not dynamically generated content based at least in part on a determination that the particular response comprises at least one of an accept-ranges headers, a last-modified header, or a content-length header.

Clause 23. The computing system of any of Clauses 15 to 22, wherein the particular response is a first response of the plurality of responses, wherein the one or more processors are configured to:
determine that a second response of the plurality of responses is not dynamically generated content based at least in part on a determination that the particular response corresponds to at least one of an image, JavaScript file, CSS, video, or font.

Clause 24. The computing system of any of Clauses 15 to 23, wherein the one or more processors are configured to:
determine a score corresponding to a likelihood that that the particular response is dynamically generated, wherein the score is based at least in part on a determination of whether the particular response comprises any of an accept-ranges headers, a last-modified header, or a content-length header, and
determine that the particular response is dynamically generated content based at least in part on the score.

Clause 25. The computing system of any of Clauses 15 to 24, wherein the one or more processors are configured to:
determine a first score corresponding to a likelihood that that the particular response is dynamically generated;
determine a second score corresponding to a likelihood that that the particular response is statically generated; and
determine that the particular response is dynamically generated content based at least in part on the first score and the second score.

Clause 26. The computing system of any of Clauses 15 to 25, wherein the one or more processors are configured to:
determine a first score corresponding to a likelihood that that the particular response is dynamically generated;
determine a second score corresponding to a likelihood that that the particular response is statically generated;
compare the first score to the second score; and
determine that the particular response is dynamically generated content based at least in part on said comparing the first score to the second score.

Clause 27. The computing system of any of Clauses 15 to 26, f wherein the one or more processors are configured to:
determine a first score corresponding to a likelihood that that the particular response is dynamically generated, wherein the first score is based at least in part on a determination of whether the particular response comprises any of an x-powered-by header, an x-aspnet-version header, an x-runtime header, an x-generator header, or a set-cookie header, or a Transfer-Encoding: chunked header;
determine a second score corresponding to a likelihood that that the particular response is statically generated, wherein the second score is based at least in part on a determination of whether the particular response comprises any of an accept-ranges headers, a last-modified header, or a content-length header; and
determine that the particular response is dynamically generated content based at least in part on a determination that first score is greater than the second score.

Clause 28. The computing system of any of Clauses 15 to 27, wherein the one or more processors are configured to:
determine that a second response of the plurality of responses is not dynamically generated content based at least in part on a determination that the particular response comprises at least one of an accept-ranges headers, a last-modified header, or a content-length header.

Clause 29. Non-transitory computer readable media comprising computer-executable instructions that, when executed by the computing system, cause the computing system to:
request content associated with a webpage from a webserver;
receive a plurality of responses from the webserver, each response including header data and content data;
identify, from the plurality of responses, a particular response that includes header data indicative of a cache miss;
determine whether the content of the particular response is dynamically generated content; and
cause display of the header data indicative of the cache miss based on a determination that the content is dynamically generated content.

Clause 30. The non-transitory computer readable media of Clause 29, wherein to identify the particular response, the computing system are configured to:
parse the particular response to identify a header includes an "x-" prefix, wherein the header data comprises the identified header.

Clause 31. The non-transitory computer readable media of any of Clauses 29 to 30, wherein to identify the particular response, the computing system are configured to:
parse the particular response to identify a header includes text comprising "x-" "cache", and "miss", wherein the header data comprises the identified header.

Clause 32. The non-transitory computer readable media of any of Clauses 29 to 31, wherein the computing system are configured to:
determine that the particular response is dynamically generated content based at least in part on content of one or more headers of the particular response.

Clause 33. The non-transitory computer readable media of any of Clauses 29 to 32, wherein the computing system are configured to determine that the particular response is dynamically generated content based at least in part on a determination that the particular response comprises at least one of an x-powered-by header, an x-aspnet-version header, an x-runtime header, an x-generator header, or a set-cookie header, or a Transfer-Encoding header with a value of "chunked".

Clause 34. The non-transitory computer readable media of any of Clauses 29 to 33, wherein the computing system are configured to determine that the particular response is dynamically generated content based at least in part on a determination that the particular response comprises chunked encoding.

Clause 35. The non-transitory computer readable media of any of Clauses 29 to 34, wherein the computing system are configured to determine that the particular response is dynamically generated content based at least in part on a determination that the particular response corresponds to at least one of an HTML request or an API request.

Clause 36. The non-transitory computer readable media of any of Clauses 29 to 35, wherein the particular response is a first response of the plurality of responses, wherein the computing system are configured to:
determine that a second response of the plurality of responses is not dynamically generated content based at least in part on a determination that the particular response comprises at least one of an accept-ranges headers, a last-modified header, or a content-length header.

Clause 37. The non-transitory computer readable media of any of Clauses 29 to 36, wherein the particular response is a first response of the plurality of responses, wherein the computing system are configured to:
determine that a second response of the plurality of responses is not dynamically generated content based at least in part on a determination that the particular response corresponds to at least one of an image, JavaScript file, CSS, video, or font.

Clause 38. The non-transitory computer readable media of any of Clauses 29 to 37, wherein the computing system are configured to:
determine a score corresponding to a likelihood that that the particular response is dynamically generated, wherein the score is based at least in part on a determination of whether the particular response comprises any of an accept-ranges headers, a last-modified header, or a content-length header, and
determine that the particular response is dynamically generated content based at least in part on the score.

Clause 39. The non-transitory computer readable media of any of Clauses 29 to 38, wherein the computing system are configured to:
determine a first score corresponding to a likelihood that that the particular response is dynamically generated;
determine a second score corresponding to a likelihood that that the particular response is statically generated; and
determine that the particular response is dynamically generated content based at least in part on the first score and the second score.

Clause 40. The non-transitory computer readable media of any of Clauses 29 to 39, wherein the computing system are configured to:
determine a first score corresponding to a likelihood that that the particular response is dynamically generated;
determine a second score corresponding to a likelihood that that the particular response is statically generated;
compare the first score to the second score; and
determine that the particular response is dynamically generated content based at least in part on said comparing the first score to the second score.

Clause 41. The non-transitory computer readable media of any of Clauses 29 to 40, f wherein the computing system are configured to:
determine a first score corresponding to a likelihood that that the particular response is dynamically generated, wherein the first score is based at least in part on a determination of whether the particular response comprises any of an x-powered-by header, an x-aspnet-version header, an x-runtime header, an x-generator header, or a set-cookie header, or a Transfer-Encoding: chunked header;
determine a second score corresponding to a likelihood that that the particular response is statically generated, wherein the second score is based at least in part on a determination of whether the particular response comprises any of an accept-ranges headers, a last-modified header, or a content-length header; and
determine that the particular response is dynamically generated content based at least in part on a determination that first score is greater than the second score.

Clause 42. The non-transitory computer readable media of any of Clauses 29 to 41, wherein the computing system are configured to:
determine that a second response of the plurality of responses is not dynamically generated content based at least in part on a determination that the particular response comprises at least one of an accept-ranges headers, a last-modified header, or a content-length header.

Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. In certain embodiments, one or more of the components described herein can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources.

When implemented as a cloud-based service, various components described herein can be implemented using containerization or operating-system-level virtualization, or other virtualization technique. For example, one or more components can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for improving webpage loading time associated with cache misses at a webserver, the method comprising:

requesting content associated with a webpage from a webserver;

receiving a plurality of responses from the webserver, each response of the plurality of responses including header data and content data;

determining a particular response of the plurality of responses includes header data indicative of a cache miss;

determining a first likelihood that content data of the particular response is dynamically generated based on receipt of a request for the content;

determining a second likelihood that the content data of the particular response is statically generated;

based on determining the particular response includes header data indicative of a cache miss, determining, using the first likelihood and the second likelihood, whether the content data of the particular response is dynamically generated based on the receipt of the request for the content; and causing display of data associated with the particular response based on determining the particular response includes header data indicative of a cache miss and determining the content data of the particular response is dynamically generated based on the receipt of the request for the content.

2. The method of claim 1, wherein determining the particular response includes header data indicative of a cache miss comprises:

parsing the particular response to identify a header of the particular response includes an "x-" prefix, wherein the header data comprises the identified header.

3. The method of claim 1, wherein determining the particular response includes header data indicative of a cache miss comprises:

parsing the particular response to identify a header of the particular response includes text comprising "x-,"-"cache," and "miss," wherein the header data comprises the identified header.

4. The method of claim 1, wherein determining whether the content data of the particular response is dynamically generated based on the receipt of the request for the content comprises:

determining whether the content data of the particular response is dynamically generated further based on content of one or more headers of the particular response.

5. The method of claim 1, wherein determining whether the content data of the particular response is dynamically generated based on the receipt of the request for the content comprises:

determining whether the content data of the particular response is dynamically generated further based on a determination that the particular response comprises at least one of an x-powered-by header, an x-aspnet-version header, an x-runtime header, an x-generator header, a set-cookie header, or a Transfer-Encoding header with a value of "chunked".

6. The method of claim 1, wherein determining whether the content data of the particular response is dynamically generated based on the receipt of the request for the content comprises:

determining whether the content data of the particular response is dynamically generated further based on a determination that the particular response comprises chunked encoding.

7. The method of claim 1, wherein determining whether the content data of the particular response is dynamically generated based on the receipt of the request for the content comprises:
    determining whether the content data of the particular response is dynamically generated further based on a determination that the particular response corresponds to at least one of an HTML request or an API request.

8. The method of claim 1, wherein the particular response is a first response of the plurality of responses, wherein the method further comprises:
    based on a determination that a second response of the plurality of responses comprises at least one of an accept-ranges header, a last-modified header, or a content-length header, determining that content data of the second response is not dynamically generated based on the receipt of the request for the content.

9. The method of claim 1, wherein the particular response is a first response of the plurality of responses, wherein the method further comprises:
    based on a determination that a second response of the plurality of responses corresponds to at least one of an image, JavaScript file, CSS, video, or font, determining that content data of the second response is not dynamically generated based on the receipt of the request for the content.

10. The method of claim 1, further comprising:
    determining a score corresponding to the first likelihood, wherein the score is based on a determination of whether the particular response comprises at least one of an accept-ranges header, a last-modified header, or a content-length header,
    wherein determining whether the content data of the particular response is dynamically generated based on the receipt of the request for the content comprises determining whether the content data of the particular response is dynamically generated further based on the score.

11. The method of claim 1, further comprising:
    determining a first score corresponding to the first likelihood; and
    determining a second score corresponding to the second likelihood,
    wherein determining whether the content data of the particular response is dynamically generated based on the receipt of the request for the content comprises determining whether the content data of the particular response is dynamically generated further based on the first score and the second score.

12. The method of claim 1, further comprising:
    determining a first score corresponding to the first likelihood
    determining a second score corresponding to the second likelihood; and
    comparing the first score to the second score,
    wherein determining whether the content data of the particular response is dynamically generated based on the receipt of the request for the content comprises determining whether the content data of the particular response is dynamically generated further based on comparing the first score to the second score.

13. The method of claim 1, further comprising:
    determining a first score corresponding to the first likelihood, wherein the first score is based on a determination of whether the particular response comprises at least one of an x-powered-by header, an x-aspnet-version header, an x-runtime header, an x-generator header, a set-cookie header, or a Transfer-Encoding: chunked header; and
    determining a second score corresponding to the second likelihood, wherein the second score is based on a determination of whether the particular response comprises at least one of an accept-ranges header, a last-modified header, or a content-length header,
    wherein determining whether the content data of the particular response is dynamically generated based on the receipt of the request for the content comprises determining whether the content data of the particular response is dynamically generated further based on a determination that first score is greater than the second score.

14. The method of claim 1, further comprising:
    determining that content data of a second response of the plurality of responses is not dynamically generated based on the receipt of the request for the content.

15. A computing system comprising:
    memory; and
    one or more processors coupled to the memory and configured to:
        request content associated with a webpage from a webserver;
        receive a plurality of responses from the webserver, each response of the plurality of responses including header data and content data;
        determine a particular response of the plurality of responses includes header data indicative of a cache miss;
        determine a first likelihood that content data of the particular response is dynamically generated based on receipt of a request for the content;
        determine a second likelihood that the content data of the particular response is statically generated;
        based on a determination that the particular response includes header data indicative of a cache miss, determine, using the first likelihood and the second likelihood, whether the content data of the particular response is dynamically generated based on the receipt of the request for the content; and
        cause display of data associated with the particular response based on the determination that the particular response includes header data indicative of a cache miss and a determination that the content data of the particular response is dynamically generated based on the receipt of the request for the content.

16. The computing system of claim 15, wherein to determine the particular response includes header data indicative of a cache miss, the one or more processors are configured to:
    parse the particular response to identify a header of the particular response includes an "x-" prefix, wherein the header data comprises the identified header.

17. The computing system of claim 15, wherein to determine the particular response includes header data indicative of a cache miss, the one or more processors are configured to:
    parse the particular response to identify a header of the particular response includes text comprising "x-," "cache" and "miss," wherein the header data comprises the identified header.

18. Non-transitory computer readable media comprising computer-executable instructions that, when executed by a computing system,
    cause the computing system to:

request content associated with a webpage from a webserver;
receive a plurality of responses from the webserver, each response of the plurality of responses including header data and content data;
determine a particular response of the plurality of responses includes header data indicative of a cache miss;
determine a first likelihood that content data of the particular response is dynamically generated based on receipt of a request for the content;
determine a second likelihood that the content data of the particular response is statically generated;
based on a determination that the particular response includes header data indicative of a cache miss, determine, using the first likelihood and the second likelihood, whether the content data of the particular response is dynamically generated based on the receipt of the request for the content; and
cause display of data associated with the particular response based on the determination that the particular response includes header data indicative of a cache miss and a determination that the content data of the particular response is dynamically generated based on the receipt of the request for the content.

19. The non-transitory computer readable media of claim 18, wherein to determine whether the content data of the particular response is dynamically generated based on the receipt of the request for the content, execution of the computer-executable instructions further causes the computing system to:
based on content of one or more headers of the particular response, determine that the content data of the particular response is dynamically generated based on the receipt of the request for the content.

20. The non-transitory computer readable media of claim 18, wherein to determine whether the content data of the particular response is dynamically generated based on the receipt of the request for the content, execution of the computer-executable instructions further causes the computing system to:
based on a determination that the particular response comprises at least one of an x-powered-by header, an x-aspnet-version header, an x-runtime header, an x-generator header, a set-cookie header, or a Transfer-Encoding header with a value of "chunked", determine that the content data of the particular response is dynamically generated based on the receipt of the request for the content.

\* \* \* \* \*